Feb. 14, 1939.　　　A. G. HAGUE　　　2,147,340
CONTAINER FOR FRUIT OR VEGETABLES
Filed May 5, 1937　　　2 Sheets-Sheet 1
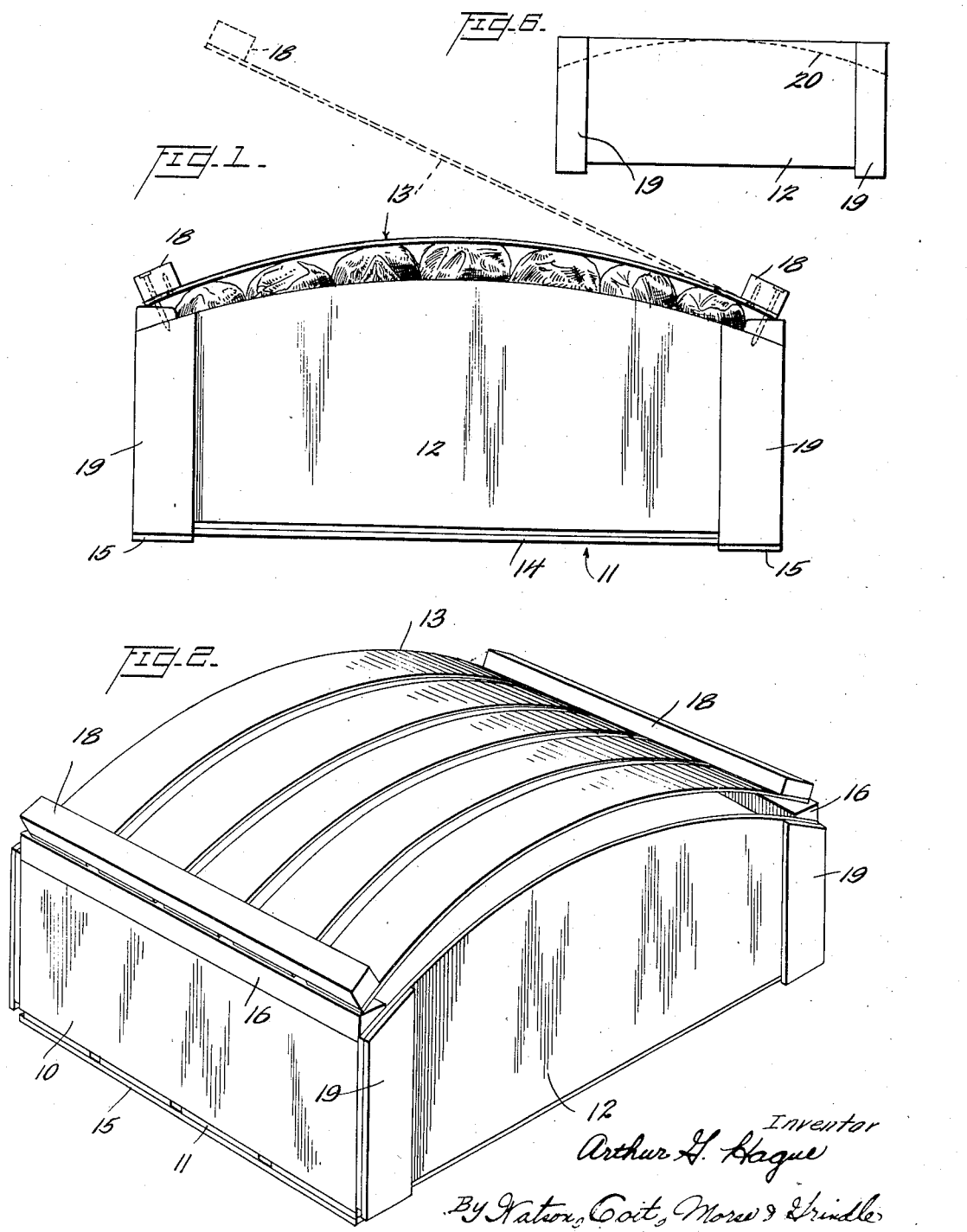

Feb. 14, 1939.                A. G. HAGUE                 2,147,340
                    CONTAINER FOR FRUIT OR VEGETABLES
                        Filed May 5, 1937           2 Sheets-Sheet 2
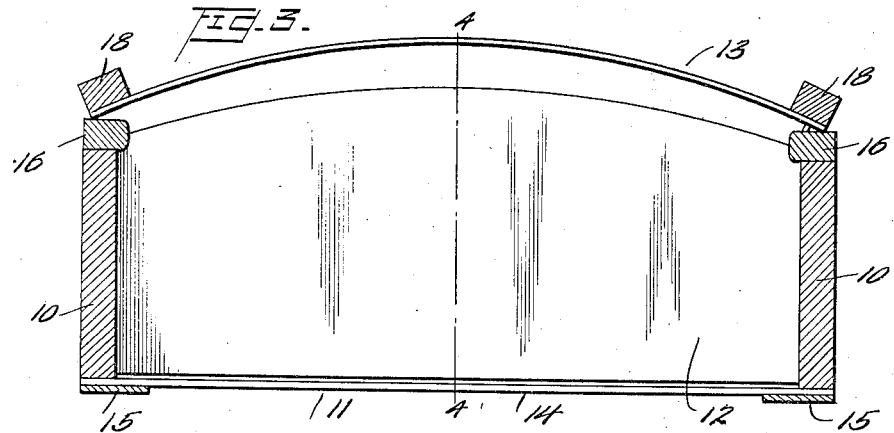
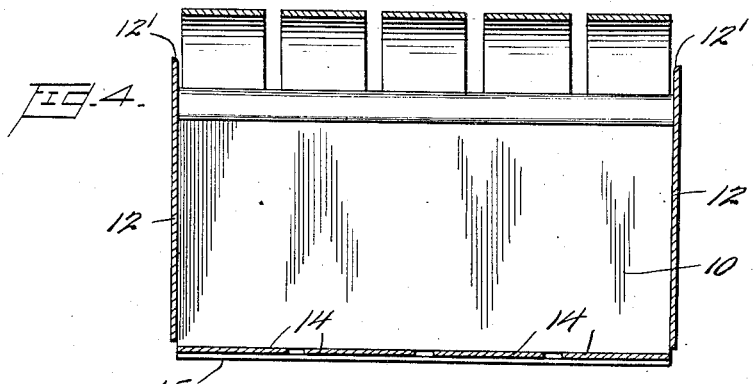
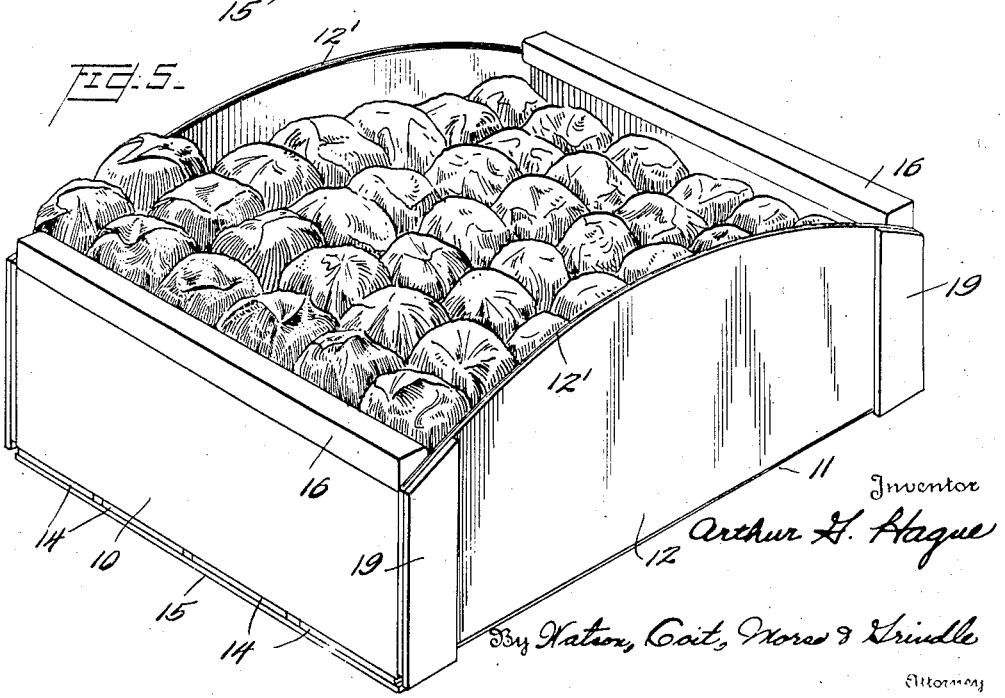

Patented Feb. 14, 1939

2,147,340

UNITED STATES PATENT OFFICE 2,147,340

CONTAINER FOR FRUIT OR VEGETABLES

Arthur G. Hague, Miami, Fla., assignor to Cummer Sons Cypress Company, Jacksonville, Fla., a corporation of Florida Application May 5, 1937, Serial No. 140,936

2 Claims. (Cl. 217—40)

The present invention relates to containers for fruits and vegetables and to methods of fabricating such containers.

The seasonal shipments of fresh fruits and vegetables from fruit or vegetable producing sections of the country to widely remote localities where such fruits and vegetables are consumed have now reached very large proportions and at the present time many varieties of fruits and vegetables are transported long distances in railroad trains and trucks to fulfill the demands for such commodities by consumers located in sections of the country where such fruits or vegetables can either not be produced at all or may be grown only during relatively short growing seasons and cannot be satisfactorily stored. Some products of this type are shipped in bulk, in freight cars, or on trucks, but many are packed in containers of various types prior to shipment. Thus oranges, grapefruit, tomatoes, peppers, and various other fruits and vegetables are, at certain seasons of the year, shipped in quantities from certain of the southern and western states to consumers in the northern states. For the purpose of safely transporting and attractively displaying such commodities various types of containers have heretofore been designed or suggested.

The present invention is concerned with a container suitable for use in the transportation of fruits and vegetables of all kinds and particularly with containers primarily intended for the transportation of fruits and vegetables of the more perishable types, such for instance as tomatoes, oranges, grapefruit and peppers. Many considerations are taken into account in the design of a container intended for use in the transportation of such commodities and not the least of these is that of appearance, it having been definitely ascertained that a container which is not only mechanically sufficient for the purpose intended but which likewise displays the commodity contained therein in an attractive manner, is much more acceptable to the consumer than one which, while mechanically sufficient, is not so attractive in appearance. Efforts to improve the salability of commodities shipped in containers have heretofore resulted in a method of container packing commonly known as the "bulge pack" method which, when practiced, results in a pack the uppermost row of fruit or vegetables of which bulges or arches upwardly or, in other words, appears to substantially more than fill the box or carton in which it is placed. By a special method of packing of the various individual fruit or vegetable units which together comprise the pack this upwardly heaped appearance may be readily obtained.

Generally in the bulge pack method of packing a container of the box type the center or middle rows of the upper layer of fruit or vegetables substantially project above the upper edge of the container side and end walls and an arched top closely engages the upper surfaces of the units of such upper layer of fruit, the ends of the arched top being secured to the upper edges of the end walls of the container. Difficulties have been met with in the use of containers of this type, however.

One such difficulty arises from the fact that the containers are difficult to pack in the packing house, at least with the necessary degree of rapidity and accuracy, the packer being forced to build up the desired bulge pack in a container the side walls of which have horizontal upper edges. In such a case, where the packer fills the container without the benefit of any guiding means or template, the desired contour of the bulge is difficult to obtain. Again, containers the upper edges of the side walls of which are disposed horizontally when the container itself is horizontally disposed are defective in that no lateral support is provided for the various units of the pack which are included in the higher portion of the bulge and which therefore, particularly in the event that fruit or vegetables of small sizes are packed, lie largely or wholly above the upper edges of the side walls. It is commonly found that these tomatoes or other fruits or vegetables, in a container so packed, which lie above and closely adjacent the side walls, may escape through the segmental aperture between the lateral edge of the top and the horizonal upper edge of the adjacent side wall or, if not actually escaping through this aperture, may so far project therethrough as to be readily bruised or, as most commonly happens, are cut by the upper edge of the side wall.

These difficulties have heretofore been appreciated and it has been suggested that paper guards or inserts may be made use of to cover the segmental apertures between the upwardly arched top of the container and the upper edges of the side walls. In actual practice, however, it is found that the use of these paper inserts or guards is disadvantageous in two respects. First the speed of the packer is substantially reduced by reason of the fact that, before the packing of any container can be commenced, the guards must be positioned and it requires an appreciable interval of time for the packer to properly place the paper guards in position before commencing to pack an empty container. Again, such paper guards do not adequately support the bulge of the pack against lateral displacement. Even during the process of packing the guards, although fabricated of relatively stiff and therefore expensive paper, these guards are unable to withstand the lateral pressure of the uppermost layer of fruit or vegetables and are forced outwardly to such an extent that they can no longer perform the functions for which they are intended.

It also frequently occurs that containers having paper guards properly emplaced at the time of packing are subjected to such shock during handling and shipment that the paper guards are forced outwardly further distances, sometimes resulting in the discharge from the container of some of its contained fruit or vegetables and at other times allowing the fruit or the like to protrude to such an extent that it becomes bruised or cut both by the upper margins or edges of the container side walls and by objects outside of the container.

The specific purpose of the present invention is to provide a container of improved type by means of which the much desired method of bulge packing may be more readily and economically practiced than has heretofore been possible; by means of which the fruit or vegetables to be shipped can actually be transported to their destination points with much less possibility of damage than heretofore has been obtainable, and which likewise comprises a more attractive receptacle for the display of fruits and vegetables to the prospective purchasers thereof. These objects are accomplished likewise without departure from certain basic essentials which must be adhered to in the design of any commercially feasible container or carton to be used in the transportation of fruits or vegetables, i. e., that the container shall cost as little as possible, be light in weight, and of adequate strength throughout, and provide for the adequate protection of its contents.

The improved container includes as essential elements imperforate side walls which are projected upwardly in such manner as to laterally support to an entirely adequate extent the upper part or "bulge" of the bulge pack. The upper edge of each side wall is continuously curved from end to end thereof, the side wall being highest at its midpoint and sloping downwardly in both directions from that point to its ends. In general the arc of curvature of the upper edge of the side wall is substantially the same as the arc of curvature which it is desired that the upper surface of the completed pack shall have, so that this upper edge is in effect a guide or template to aid or assist the packer in arranging the contents. As a matter of fact, the presence upon opposite sides of the space to be packed of these guiding edges is of the greatest assistance to the packer, permitting him to position the fruit or vegetables with great rapidity and without danger of causing the bulge of the pack to be too high or too low. Certain of the other elements of the box may be of conventional type.

In the accompanying drawings one form of the improved container is disclosed in full detail. It will be appreciated that the container may be varied in size and in certain minor respects without departure from the spirit and scope of the invention.

In the drawings:

Figure 1 is a side elevation of the container when fully packed, the top being shown in final container closing position in full lines, and in an intermediate position, prior to full application, in dotted lines;

Figure 2 is a perspective view of the fully packed and closed container;

Figure 3 is a longitudinal vertical section through the container;

Figure 4 is a section on line 4—4 of Figure 3;

Figure 5 is a perspective view of the container showing the same partially packed with fruit; and Figure 6 shows, on a reduced scale, the blank from which the container side wall is made by a cutting operation which removes a portion of the blank, leaving one edge of the side wall in arcuate form.

The container may be said to comprise as its principal elements the ends 10, bottom 11, side walls 12 and top 13, all fabricated of wood. The end walls 10 are rectangular members and are relatively heavy whereas the top, bottom and sides are formed from much lighter material. The bottom 11 comprises a plurality of parallel longitudinally extending slats 14 the ends of which are nailed to the under surfaces of the end members 10, transversely extending cleats 15 being affixed to end members 10 by nails passing through the slats 14, for greater security. The bottom slats are spaced apart to permit the passage of air into the container for the purpose of ventilating the same. Suitably nailed to the upper surfaces of the ends 10 are the transversely extending cleats 16 having rounded inner edges respectively so as not to cut the fruit or other contents of the container, and the top 13 has its ends nailed to the cleats 16, as shown in Figures 1 and 3 and other figures. The top comprises a plurality of parallel thin flexible slats, preferably fabricated of gum, the slats being secured to cleats 18 as by means of staples.

The sides are formed as shown, preferably comprising sheets of thin pine veneer reinforced at their ends by cleats or battens 19. In the formation of each side a rectangular member is first fabricated by securing battens 19 to the ends of a rectangular imperforate member of thin wood, as shown in Figure 6. Thereafter a portion of this member is severed from the remainer by a cutting operation, preferably by a saw, along a line such as indicated at 20 in Figure 6, the portion of the blank above this plane being discarded and that below being used as a side for the container. By first affixing the battens 19 to the ends of the wooden sheet 12, and thereafter cutting from the rectangular blank thus formed the portion which is to be discarded, economies in manufacture are effected, despite the waste resulting, and a superior side is fabricated. Thus the necessity of affixing battens with curved ends to a side having a curved edge is avoided, which it would be necessary to do if the battens and curved side were separately fabricated and subsequently assembled. Likewise the curved end surfaces of the battens are in reality true continuations of the curved upper edge of the side proper so that no portion of any battens projects above the upper edge of the side to which they are attached.

In Figure 5 a container is shown which is entirely packed with fruit, except for portion of the top layer, and from this view it may readily be perceived that the upper portions of the side walls of the container function not only to laterally support the upper portion of the bulge of the pack when completed but likewise comprise guides enabling the packer to more truly lay or position the fruit in the formation of a perfectly curved or bulged pack. After the upper layer of fruit has been completely positioned, the cover may be applied and this is effected by first nailing to one of the cleats 16, which in reality comprises a removable part of the container end, one of the cleats 18 of the top, the remainder of the top momentarily occupying the position in which it is shown in dotted lines in Figure 1. Thereafter the cleat at the opposite end of the top is brought downwardly and nailed to the opposite cleat 16, the slats 13 of the top, by reason of their flexibility, assuming the curve of the bulge pack, lightly resting upon the upper surfaces of the several tomatoes or the like which together form the upper surface of the pack but, when finally nailed in position, firmly holding this upper layer and in fact the entire pack in position.

The longitudinally extending lateral edges of the top define, together with the curved upper edges of the sides, arcuate slots through which the upper layer of packed articles may be observed, and these apertures, together with the spaces between the slats of top and bottom, constitute ventilating openings through which air currents may freely pass into and out of the container. Except for the end members 10, all parts of the container are fabricated of thin and lightweight elements and the container as a whole is light, strong, inexpensive and pleasing in appearance.

In order to minimize danger of cutting or bruising of the outer upper rows of fruit, which rows contact with the curved upper edges of the box sides, the inner corners of these edges are rounded or bevelled, as indicated at 12' in Figure 4. In actual use, containers of the type described are found to be eminently satisfactory for the storage and transportation of even the most easily damaged fruits or vegetables.

Having thus described the invention, what is claimed as new and desired to be secured by Letters Patent is:

1. A lightweight shipping and display container for fruit or vegetables including end, side, bottom and top members fabricated of wood, and two transversely extending spacing elements or cleats mounted upon the upper edge surfaces of the end members respectively, the sides having portions integral therewith extending upwardly above the end members to laterally support and protect the upwardly bulging portion of a contained body of fruit or vegetables, each such upwardly projecting portion terminating in a free edge which slopes downwardly from its mid-point in both directions to its ends respectively, the container sides, at the ends thereof, projecting upwardly above the end members and the spacing elements or cleats lying at least in part below the upper edges of the end portions of the sides, and the top comprising spaced thin elongated flexible slats and cleats secured to the ends of said slats upon the upper surfaces thereof, said cleats connecting the slats and being secured respectively to the transversely extending spacing elements or cleats, the top being arched upwardly intermediate said spacing elements to provide a substantially cylindrically curved cover to closely engage the upper layer of fruit and the curved lateral edges of the top defining, with the upper edges of the sides, elongated curved apertures constituting ventilating and inspection openings but being insufficient in width to permit egress of fruit.

2. A lightweight shipping and display container for fruit or vegetables including end, side, bottom and top members fabricated of wood, and two transversely extending spacing elements or cleats mounted upon the upper edge surfaces of the end members respectively, the sides having portions integral therewith extending upwardly above the end members to laterally support and protect the upwardly bulging portion of a contained body of fruit or vegetables, each such upwardly projecting portion terminating in a free edge which slopes downwardly from its mid-point in both directions to its ends respectively, the container sides, at the ends thereof, projecting upwardly above the end members and the spacing elements or cleats lying at least in part below the upper edges of the end portions of the sides, and the top comprising spaced thin elongated flexible slats and cleats secured to the ends of said slats upon the upper surfaces thereof, said cleats connecting the slats and being secured respectively to the transversely extending spacing elements or cleats, the top being arched upwardly intermediate said spacing elements to provide a substantially cylindrically curved cover to closely engage the upper layer of fruit and the ends of the slats comprising the top having line contact with the spacing elements respectively, the curved lateral edges of the top defining, with the upper edges of the sides, elongated curved apertures constituting ventilating and inspection openings but being insufficient in width to permit egress of fruit.

ARTHUR G. HAGUE.